United States Patent [19]
Steiner

[11] Patent Number: 5,165,597
[45] Date of Patent: Nov. 24, 1992

[54] AIR MOVING APPARATUS AND METHOD FOR VEHICLES

[75] Inventor: Norman F. Steiner, Longmont, Colo.

[73] Assignee: Air Comm Corporation, Boulder, Colo.

[21] Appl. No.: 712,587

[22] Filed: Jun. 10, 1991

Related U.S. Application Data

[63] Continuation-in-part of Ser. No. 667,265, Mar. 11, 1991, abandoned.

[51] Int. Cl.$^5$ .............................................. B60H 1/02
[52] U.S. Cl. ............................... 237/12.3 A; 454/76; 454/69
[58] Field of Search .................... 237/12.3 A, 12.1; 454/69, 71, 75, 76, 77, 83

[56] References Cited

U.S. PATENT DOCUMENTS 4,693,172  9/1987  Harvey ................................ 454/76

Primary Examiner—Henry A. Bennet
Attorney, Agent, or Firm—Harold A. Burdick

[57] ABSTRACT

Air moving apparatus and method are disclosed for use in vehicles having an engine providing a source of relatively high pressure bleed air. The apparatus includes a pressurized air input connected with the high pressure source of bleed air at the engine, a conduit having an inlet and an outlet, and an ejector positioned in the conduit adjacent to the pressurized air input for directing the pressurized air toward the conduit outlet at a velocity sufficient to induce movement of a larger volume of air through the conduit inlet. By selective configuration of ejector outlet port size, the temperature of air moved through the conduit is controlled so that the apparatus can be utilized with vehicle compartment cooling, ventilating, and/or air circulation systems.

20 Claims, 4 Drawing Sheets

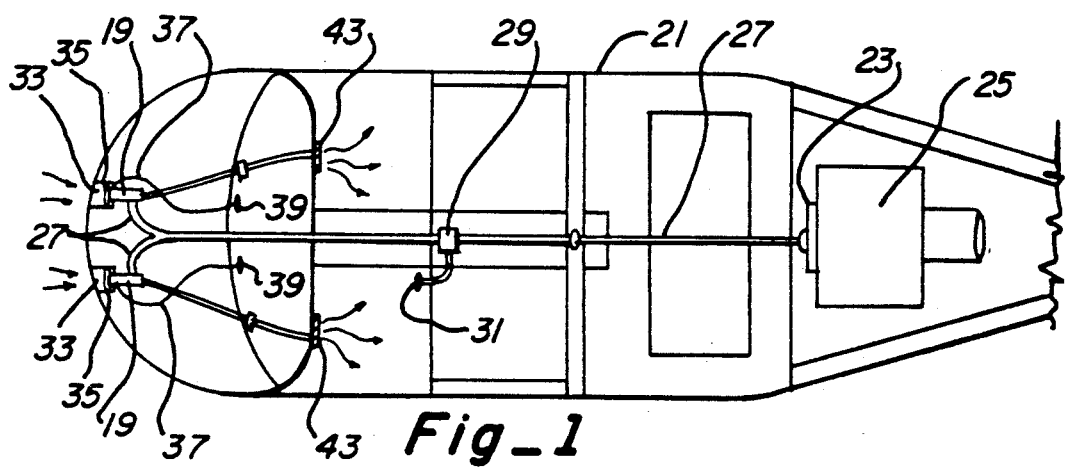
Fig_1
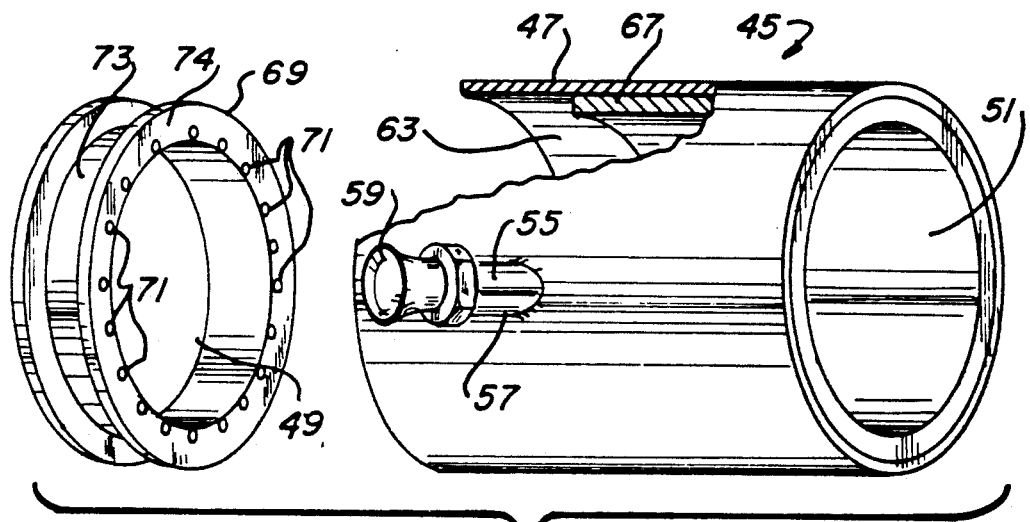
Fig_2
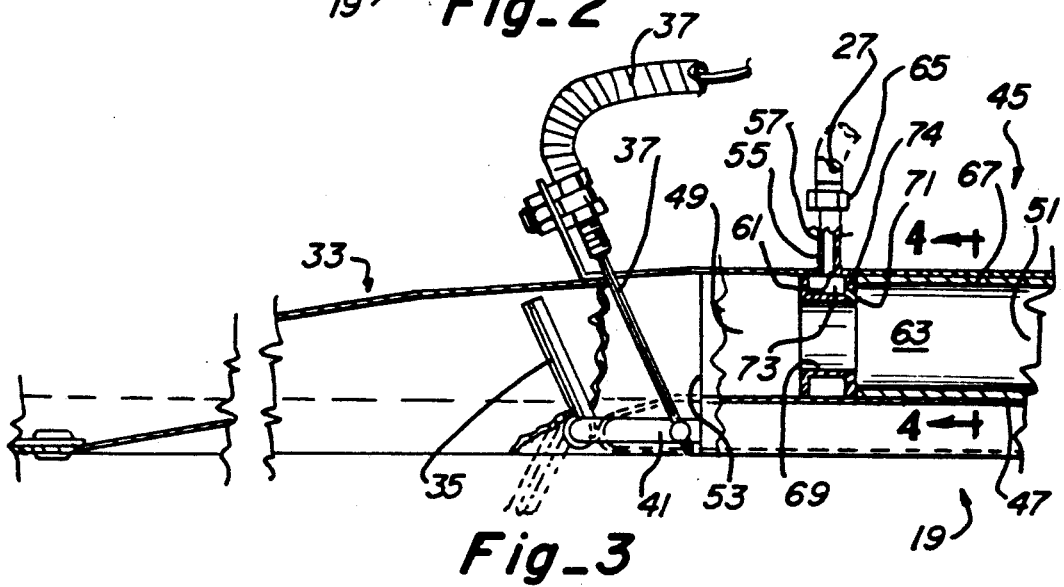
Fig_3

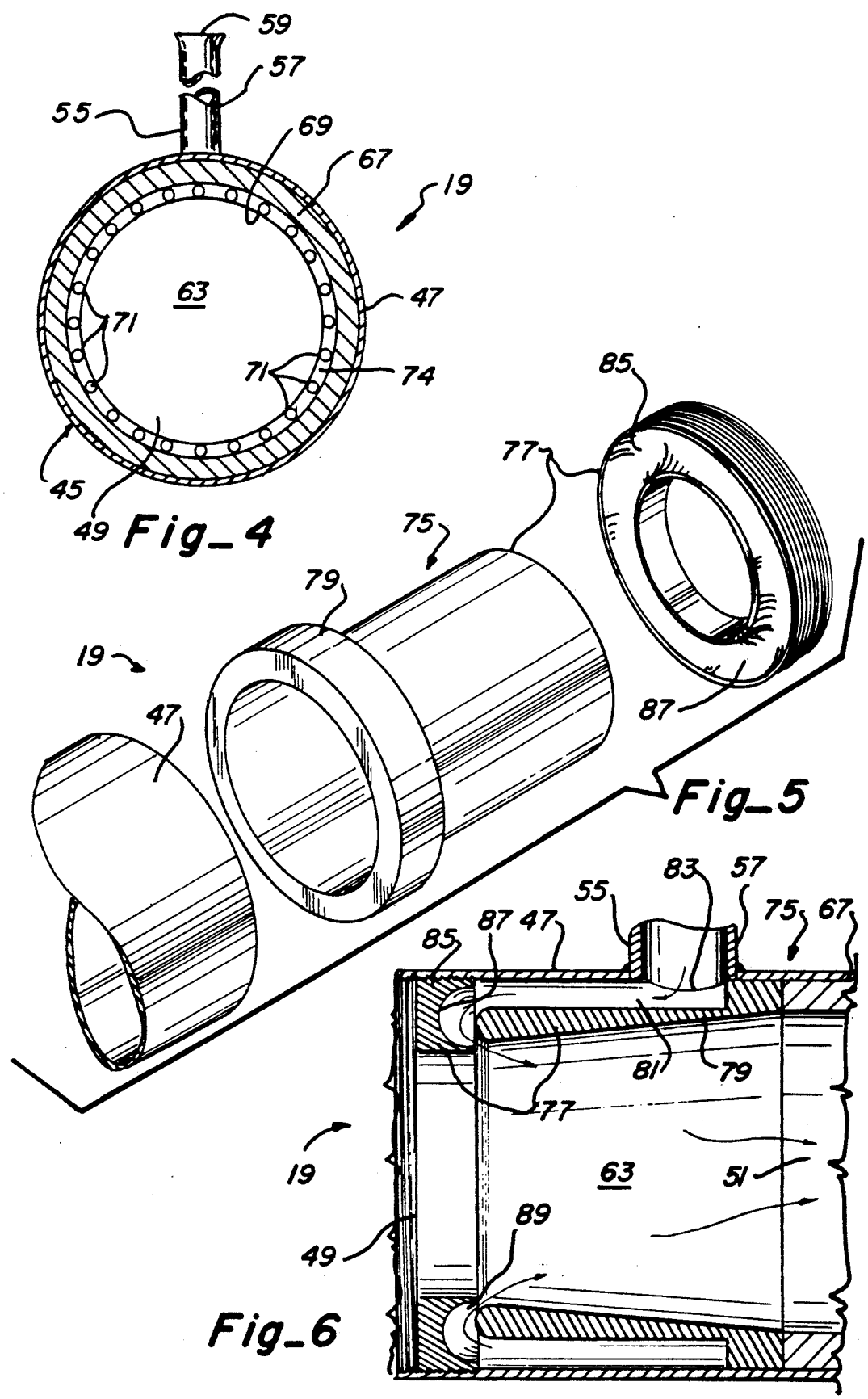

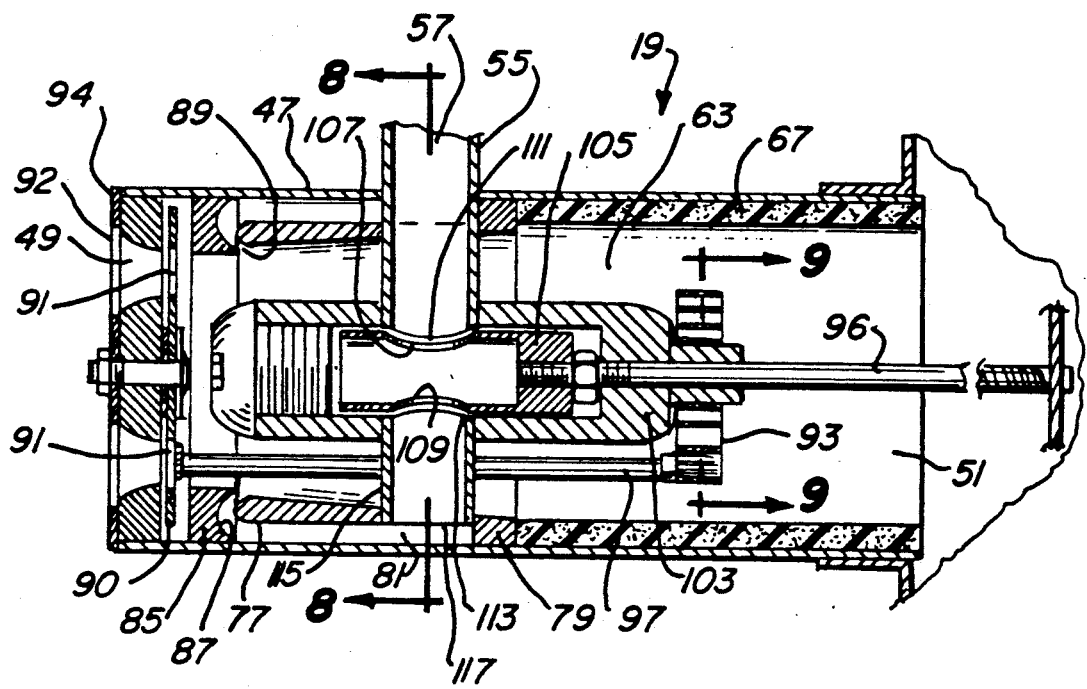
Fig_7
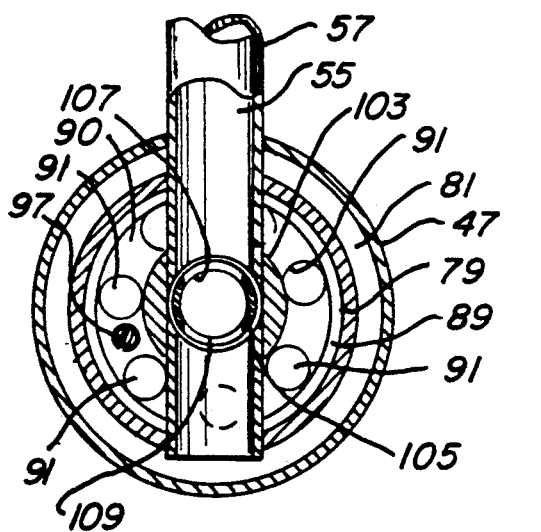
Fig_8
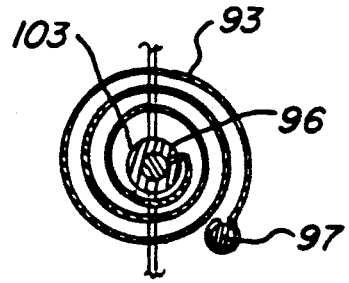
Fig_9
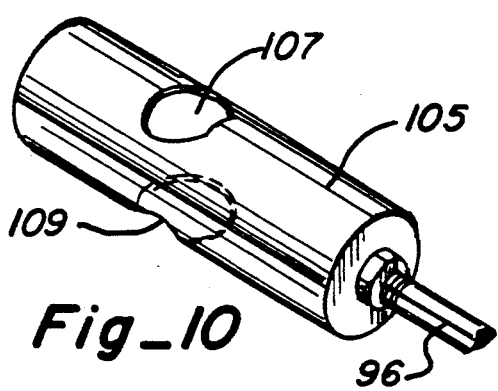
Fig_10

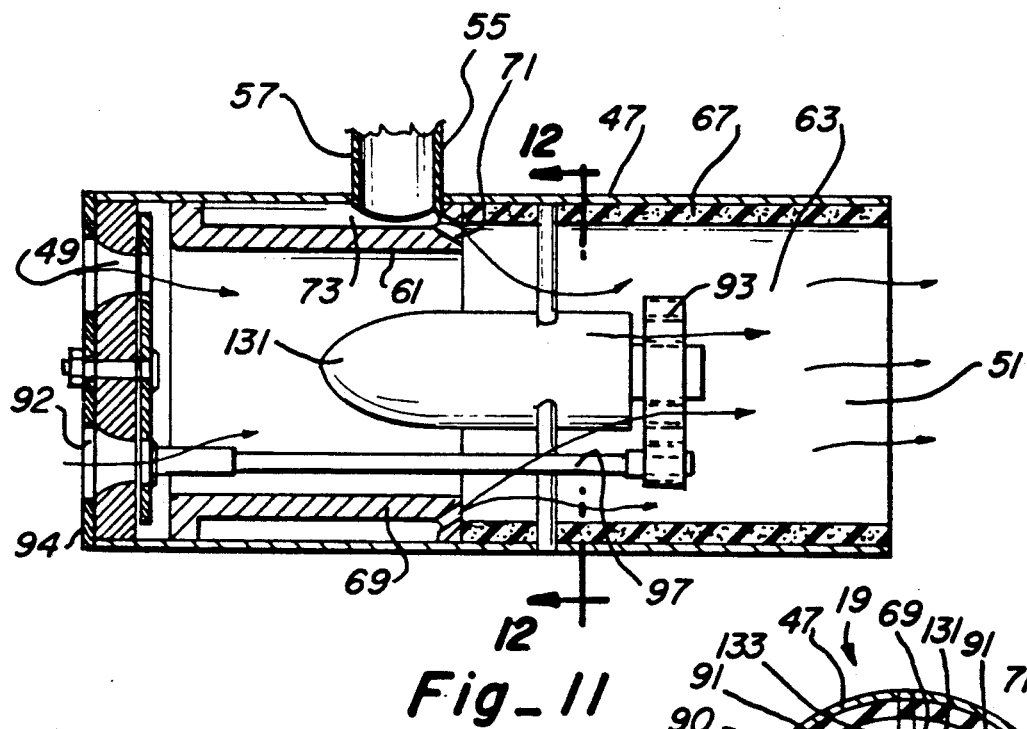
Fig_11
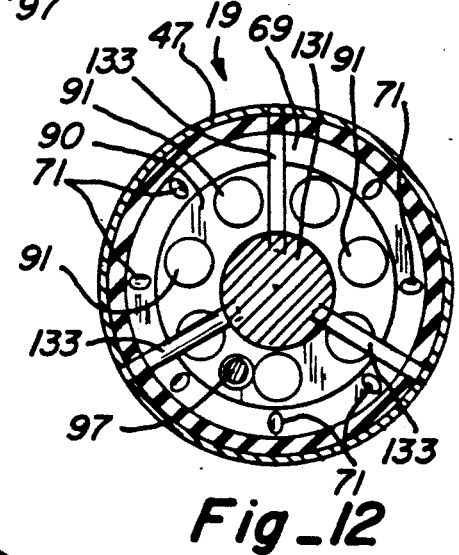
Fig_12
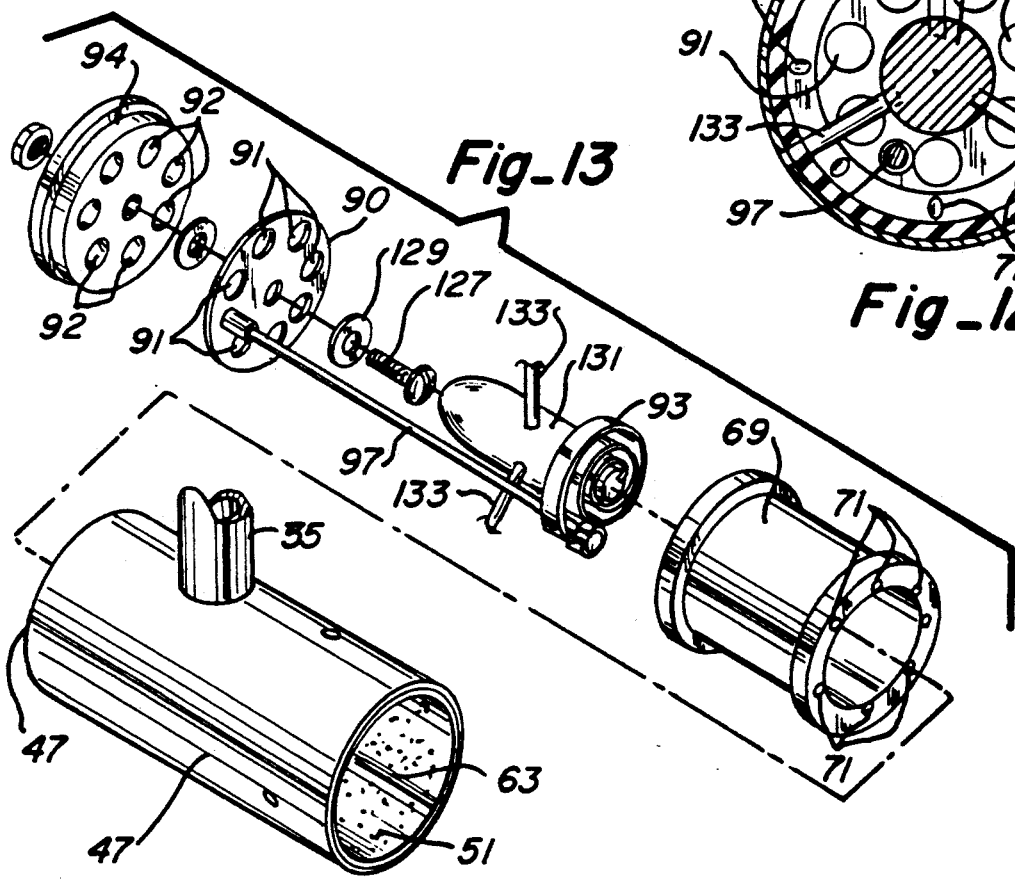
Fig_13

5,165,597

AIR MOVING APPARATUS AND METHOD FOR VEHICLES

RELATED APPLICATION

This Application is a Continuation-In-Part of U.S. patent application Ser. No. 07/667,265 Entitled "Heated Air Distributing Apparatus For Vehicles", filed Mar. 11, 1991, now abandoned.

FIELD OF THE INVENTION

This invention relates to air moving apparatus and methods, and, more particularly, relates to such apparatus and methods for ventilating engine powered vehicles.

BACKGROUND OF THE INVENTION

A variety of aircraft cabin ventilating and air cooling, heating and/or circulating systems have been heretofore suggested and/or utilized (see, for example, U.S. Pat. No. 2,737,874). In addition, some heating and/or defrost systems have heretofore utilized hot engine bleed air (see U.S. Pat. Nos. 4,978,064, 4,308,993 and 4,693,172). While those systems have been effective for some applications, some such systems have not always made optimal use of high pressure engine bleed air for a variety of air moving functions, including in cooling, ventilating, heating and/or air circulation systems, and have often proven to be unduly complex, subject to malfunction, and difficult to install, particularly in cases of retrofitting.

It would thus be desirable to provide an air moving system that is easy to install and operate, that makes efficient use of engine bleed air for a variety of functions, that provides durability, reliable performance and relatively quiet operating characteristics, and that functions irrespective of movement of the vehicle, particularly important, for example, for cooling or ventilating of periodically substantially stationary vehicles.

SUMMARY OF THE INVENTION

This invention provides an air moving apparatus and method for distributing air in compartments of vehicles which has few or no moving parts, which is suitable to a variety of air moving functions, for example in cooling, ventilating, and/or air circulating systems, which utilizes pressurized engine bleed air for any such air moving function to which it is applied, and which is easy to install and maintain.

The apparatus includes structure defining a channel having an air inlet and an air outlet, a pressurized air input connected to the structure between the inlet and outlet thereof, the input being connectable with a source of pressurized, engine heated air from the vehicle engine, and a directing element connected with the structure adjacent to the channel and to the pressurized air input. The directing element has a port or ports opening into the channel for directing air from the pressurized air input toward the outlet of the structure, movement of a volume of pressurized air into the channel inducing movement of a sufficiently large volume of air through the inlet of the structure so that air at the outlet is only slightly warmer than air at the inlet of the structure. Port size is selected to maintain air taken through the inlet of the channel in a substantially unheated condition.

The apparatus can be conveniently located in ventilating, cooling or air recirculating lines. The apparatus and method are particularly well adapted for use in compartment cooling systems for helicopters where the cool air is provided through an airbox mounted in a forward part of the helicopter's body.

It is therefore an object of this invention to provide an improved air moving apparatus and method for vehicles having an engine, where the engine has available a source of pressurized air, for example bleed air from the compressor of an aircraft engine.

It is another object of this invention to provide an air moving apparatus having a channel with an inlet, an outlet, and a pressurized air input between the inlet and outlet, the input being connectable to a source of pressurized air, and a directing element adjacent to the channel and pressurized air input for directing pressurized toward the outlet of the channel thereby inducing movement of a larger volume of air through the inlet of the channel.

It is still another object of this invention to provide an air moving apparatus for vehicles having an engine which includes a channel having an inlet, an outlet, and a pressurized air input between the inlet and outlet, the input being connectable to a source of pressurized air from the vehicle's engine, and a directing element adjacent to the channel and pressurized air input for directing pressurized air toward the outlet of the channel thereby inducing movement of a larger volume of air through the inlet of the channel, the directing element including structure for controlling at least one of the velocity and the volume of pressurized air moving into the channel through the directing element.

It is another object of this invention to provide a compartment cooling apparatus for vehicles having an engine, the vehicle having means for providing a source of air not substantially warmer than ambient air outside the vehicle, and the engine providing a source of pressurized air, the apparatus including a conduit having an inlet connectable with the means for providing a source of air and an outlet connectable with a vent in the vehicle compartment, a pressurized air input connected to the conduit and connectable with the source of pressurized air, and a directing element positioned in the conduit adjacent to the pressurized air input and having a port or ports opening into the conduit and configured for directing air from the pressurized air input at a velocity toward the outlet of the conduit, the port or ports being of a size relative to the inlet of the conduit so that movement of a volume of pressurized air into the conduit induces movement of a larger volume of air through the inlet of the conduit thus not substantially increasing the temperature of air received through the means for providing a source thereof.

It is another object of this invention to provide an air moving method for distributing air in compartments of vehicles having an engine, the engine providing a source of pressurized, engine heated air, the method including the steps of defining a channel having an inlet and an outlet, directing pressurized air from the source thereof to the channel, and releasing the pressurized air at a velocity into the channel between the inlet and the outlet through a port or ports thereby directing the pressurized air toward the outlet, the port or ports being of a size relative to the inlet of the channel so that movement into the channel of a volume of the pressurized air induces movement of a larger volume of air through the inlet of the channel.

It is another object of this invention to provide an apparatus and method for moving air in vehicle compartments having an engine, the engine providing a source of pressurized air, wherein a channel having an inlet and an outlet is defined, pressurized air is directed from the source thereof to the channel and released at a velocity into the channel between the inlet and the outlet through a port or ports, the volume and/or velocity of pressurized air released into the channel being controlled by selecting the size of the port or ports.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a schematic illustration (top view) of a helicopter having the air moving apparatus of this invention therein for cooling or ventilating the cabin compartment thereof;

FIG. 2 is an exploded view (having portions cut away) of a first embodiment of the apparatus of this invention;

FIG. 3 is a sectional view of the apparatus of FIG. 2 shown with a sectional view of a known fresh air inlet unit;

FIG. 4 is a sectional view taken through section lines 4—4 of FIG. 3;

FIG. 5 is an exploded view of a second embodiment of the apparatus of this invention;

FIG. 6 is a sectional view of the apparatus of FIG. 5;

FIG. 7 is a sectional view illustrating the second embodiment of the apparatus modified for use as a heating unit;

FIG. 8 is a sectional view taken through section lines 8—8 of FIG. 7;

FIG. 9 is a sectional view taken through section lines 9—9 of FIG. 7;

FIG. 10 is a perspective view of the engine bleed air control valve of the unit in FIG. 7;

FIG. 11 is a sectional view illustrating use of the first embodiment of the apparatus as a heating unit;

FIG. 12 is a sectional view taken through section lines 12—12 of FIG. 11; and

FIG. 13 is an exploded view of the unit in FIG. 11.

DESCRIPTION OF THE INVENTION

Apparatus 19 of this invention are illustrated in FIG. 1 installed in helicopter 21 for use in moving air substantially at ambient temperature (i.e., with temperature rise of less than about 1° to 4° F.) from outside the helicopter to the cabin compartment to ventilate and/or cool the cabin.

Apparatus 19 are connected with a source of pressurized bleed air from compressor 23 of engine 25 of helicopter 21 utilizing conduits 27 in a rooting system (for example as taught in U.S. Pat. No. 4,978,064, the relevant portions of which are incorporated herein by this reference). Main bleed air control valve 29, having valve control 31, is connected in one of conduits 27 to control the flow characteristics of pressurized bleed air from compressor 23 to any of the apparatus 19 (any number of such valves being utilizable in different conduits 27).

The pressurized bleed air, for example from a typical helicopter engine, utilized by air moving apparatus 19 is supplied at temperatures of up to between 400° and 650° Fahrenheit and at a pressure of about 80 psi or greater. Since it is desirable to control the temperature of air leaving the apparatus of this invention (for example having very little temperature rise when used as illustrated in FIG. 1 or as an air mover for an air conditioner, while, when used for cabin heating and/or windscreen and window defrosting and defogging, an outlet temperature maintained in a range of between 140° and 200° Fahrenheit is desirable), provision is made as hereinafter illustrated to provide outlet air temperatures in keeping with the intended function and application of the apparatus despite the high temperature of the bleed air from the engine.

Apparatus 19 are connected at their inlet side to inlet airboxes 33 (either a ram inlet airbox or flush mounted inlet airbox known to those skilled in the art) mounted in the forward lower part of the body of helicopter 21 for selectively providing a source of air at ambient temperature from the outside of the helicopter.

As may be appreciated, the inlet airboxes provide a ready source of moving air to the helicopter compartment while the helicopter is moving forward, but provides little or no air movement on their own when a helicopter is not moving forward, for example when hovering or awaiting takeoff.

Airboxes 33 include air flow control flaps 35 controlled by cables 37 connected to control handles 39 for providing user control over receipt of air from the exterior of the helicopter through the airboxes.

Turning now to FIGS. 2 through 4, a first embodiment of apparatus 19 is illustrated in conjunction with flush mount airbox 33 having flap 35 controlled by cable 37 connected to control lever 41 (see FIG. 3). The flush mount airbox is well known to those skilled in the art and is typical, for example, of the flush mount airbox mountable in the Sikorski S76 helicopter ventilation system. In that arrangement, the airbox leads directly to a conduit having an outlet at a vent (for example vent 43 in FIG. 1) to thus provide ventilation in the helicopter (but substantially only when the craft is moving forward).

First embodiment 45 of apparatus 19 includes conduit structure 47 (for example about a 2 to 2.5 inch diameter tube having a length of about 4 inches) having inlet opening 49 and outlet opening 51, inlet opening 49 being connectable either directly or by a conduit, to outlet 53 of airbox 33, and outlet 51 being connected, either directly or by a conduit, to vent 43. Pressurized air input structure 55 is connected with conduit 47, for example by welding, and includes conduit 57 (for example, about a 0.25 inch diameter tube) having a flared inlet opening 59 and an outlet opening 61 opening into linear channel, or chamber, 63 defined by the inner wall of conduit 47. Compression nut 65 is positioned over conduit 57 for connecting the conduit to a threaded conduit 27 providing a source of pressurized, normally during engine operation, hot bleed air from the engine of the vehicle.

A damping medium 67 is positioned in the forward part of conduit 47 to damp noise. Air directing element, or manifold, 69 having a plurality of circumferentially arranged ports 71 (for example between about 10 to 20 ports) is positioned in the conduit, for example by press fitting, and is configured as a spool-like structure, thus defining chamber 73 adjacent to inlet 61 of pressurized air input 55. When used as a device for cooling and/or ventilating the interior of the vehicle, ports 71 are approximately 0.020 inch diameter holes positioned around the periphery of forward wall 74 of directing element 69. Port diameters of up to 0.060 inches or more may be utilized, for example, to provide heated air at outlet 51 of apparatus 19. By selection of the port size, apparatus 19 outlet air temperature may be substantially unchanged (a temperature rise at the outlet of only about 1 to 2 degrees F. above the temperature of air at the inlet when utilizing the 0.020 inch diameter ports with a 2 to 2.5 inch diameter conduit 47) or may be heated in varying degrees by providing larger ports.

FIGS. 5 and 6 illustrate second embodiment 75 of apparatus 19, which is in many regards (including exemplary dimensions) similar to the embodiment of the apparatus illustrated in FIGS. 2 through 5. Embodiment 75 includes conduit structure 47 defining channel, or chamber, 63 and having inlet 49 and outlet 51 connected as heretofore described. Pressurized air input 55 is provided as set forth heretofore. However, directing element 77 is a two-part element including a first portion 79 defining a collection chamber 81 adjacent to inlet 83 from pressurized air input 55, and a second portion 85 having arcuate surface 87 positioned in conduit 47 to redirect pressurized air received in chamber 81 toward outlet 51 of conduit 47. Second portion 85 is, for example, threaded into conduit 47, while first portion 79 is, for example, compression fitted in conduit 47. Unitary circumferential outlet port 89 is defined between the end of first portion 79 and arcuate surface 87 of second portion 85, the size of outlet port 89 again determining the temperature range of air, ranging from substantially no temperature rise to a temperature rise sufficient for providing selectively heated air, at outlet 51 of embodiment 75 of apparatus 19 (for example again in a range of between 0.020 and 0.060 inches across the port opening).

When apparatus 19 is utilized as shown in FIG. 1, or to otherwise circulate or distribute air, as a volume of pressurized air enters channel 63 through appropriately sized small port openings at an accelerated velocity, a larger volume of air is drawn through inlet 49 thus resulting in very little air temperature rise at outlet 51 despite the relatively high temperature of bleed air passing into the channel. For example, with bleed temperature reaching between about 350° to 550° F., and reaching pressures of between about 60 to 100 psi, the ratio of inlet opening 49 area to total bleed air inlet port area is preferably between about 700 and 900 (to one).

As illustrated in FIGS. 7 through 13, the apparatus of this invention may also be utilized to move, circulate and/or heat cabin air by enlarging the size of the outlet ports to selectively allow more hot bleed air into chamber 63.

The heating apparatus illustrated in FIGS. 7 through 10 utilizes a modification of embodiment 75 of apparatus 19. Bimetallic sensing element 93 is connected by rod 97 to flow barrier 90 having ports 91 therein to thus bring ports 91 into and out of registration with ports 92 in end section 94 inserted in conduit 47, responsive to the temperature of air adjacent to outlet opening 51 (i.e., allowing more cabin air input when a selected maximum temperature is sensed and less as outlet temperature decreases). Rod 96 is connected through mounting barrel 103 to valve 105 having first and second ports 107 and 109 at opposite sides thereof. Port 107 is brought into and out of registry with outlet 111 of input 55 by rotation of rod 96. Port 109, simultaneously with the bringing into and out of registry of port 107 with outlet 111, is brought into and out of registry with inlet port 113 of conduit 115 connected with barrel 103 thus selectively allowing the passage of bleed air from input 55 through valve 105 and into conduit 115. Conduit 115 is connected at its outlet 117 to an inlet port to air directing element, or manifold, 79.

Another embodiment of apparatus 19, again for providing selectively heated air, is shown in FIGS. 11 through 13 utilizing the structure of embodiment 45 of apparatus 19. Again, chamber 63 is defined by conduit structure 47 and has outlet opening 51 into the vehicle compartment at one end thereof, and inlet ports 92 through end section 94 for passage of cabin air at ambient temperature into chamber 63 at the other end thereof. Damping medium 67 is again provided as is bimetallic sensing element 93 connected by rod 97 to flow barrier 90 having ports 91 therein. Flow barrier 90, however, is maintained adjacent to end section 94 on screw 127 through washer 129.

Bimetallic element 93 is fixedly mounted at one end to mounting barrel 131 maintained in contact with the walls of conduit structure 47 on mounting rods 133. Manifold 69 receives high pressure hot bleed air through input 55 and distributes the hot bleed air into channel 63 through the plurality of outlet ports 71 (herein, larger sized ports), the pressurized bleed entering the channel thus inducing air flow through ports 91/92.

As may be appreciated, an improved air moving apparatus and method for engine powered vehicles are provided by this invention which utilize high pressure air from the vehicle engine for a variety of air moving function including in heating, cooling, ventilating and/or circulating systems.

What is claimed is:

1. An air moving apparatus for distributing air in compartments of vehicles having an engine, the engine providing a source of pressurized, engine heated air, said apparatus comprising:

structure defining a channel having air inlet and outlet openings;

a pressurized air input connected to said structure between said inlet and outlet openings thereof and being connectable with the source of pressurized air; and directing means connected with said structure adjacent to said channel and said pressurized air input and having port means opening into said channel, said directing means for directing air from said pressurized air input toward said outlet opening of said structure through said port means, said port means being of a size relative to said inlet opening of said structure so that movement into said channel of a volume of the pressurized air induces movement of a sufficiently large volume of air through said inlet opening of said structure so that air at said outlet opening of said structure is only slightly warmer than air at said inlet opening.

2. The apparatus of claim 1 wherein said directing means includes first and second portions each connected with said structure in said channel, said port means being defined between said first and second portions and extending circumferentially adjacent to said structure.

3. The apparatus of claim 2 wherein said second portion of said directing means includes an arcuate wall portion for directing the pressurized air through said port means toward said outlet opening of said structure.

4. The apparatus of claim 1 wherein said port means of said directing means is a plurality of ports arranged circumferentially adjacent to said structure.

5. The apparatus of claim 1 wherein the pressurized air reaches a temperature of between about 350° and 550° F. and a pressure of between about 60 and 100 psi, and wherein said inlet opening has an area and said size of said port means provides an area, the ratio of said inlet opening area to said port means area being between about 700 and 900.

6. The apparatus of claim 1 further comprising means for controlling at least one of a velocity and said volume of pressurized air moving into said channel through said port means.

7. A compartment cooling apparatus for vehicles having an engine, said vehicle having means for providing a source of air not substantially warmer than ambient air outside of the vehicle, and said engine providing a source of pressurized, engine heated air, said apparatus comprising:
   a conduit having an inlet connectable with the means for providing a source of air and an outlet connectable with a vent in the vehicle compartment;
   a pressurized air input connected to said conduit and connectable with the source of pressurized air; and
   directing means positioned in said conduit adjacent to said pressurized air input and having port means opening into said conduit and configured for directing air from said pressurized air input at a velocity toward said outlet of said conduit, said port means being of a size relative to said inlet of said conduit so that movement of a volume of the pressurized air in said conduit induces movement of a sufficiently large volume of air through said inlet of said conduit so that air at said outlet of said conduit is only slightly warmer than air at said inlet.

8. The apparatus of claim 7 wherein said port means is a circumferential opening adjacent to a channel wall defined by said conduit.

9. The apparatus of claim 7 wherein said port means is a plurality of openings circumferentially arranged adjacent to a channel wall defined by said conduit.

10. The apparatus of claim 9 wherein said inlet of said conduit has a diameter of between about 2 to 2.5 inches and said openings have a diameter of about 0.02 inches.

11. The apparatus of claim 7 wherein said input is connected to said conduit between said inlet and said outlet.

12. The apparatus of claim 7 wherein the vehicle is a helicopter, the means for providing a source of air is an airbox mounted in the helicopter body for receiving air from outside the helicopter, and wherein said conduit defines a linear channel between said inlet and said outlet.

13. An air moving method for distributing air in compartments of vehicles having an engine, the engine providing a source of pressurized, engine heated air, said method comprising the steps of:
   defining a channel having an inlet and an outlet;
   directing pressurized air from the source thereof to said channel; and
   releasing the pressurized air at a velocity into said channel between said inlet and said outlet through port means for directing the pressurized air toward said outlet, said port means being of a size relative to said inlet of said channel so that movement into said channel of a volume of the pressurized air induces movement of a sufficiently large volume of air through said inlet of said channel so that air at said outlet of said channel is only slightly warmer than air at said inlet.

14. The method of claim 13 further comprising providing air from outside the vehicle at said inlet of said channel, said size of said port means being selected so that air temperature at said outlet of said channel is less than about four degrees F. warmer than said air from outside the vehicle.

15. The method of claim 13 wherein the step of releasing the pressurized air includes releasing the pressurized air through port means adjacent to a wall of said channel.

16. The method of claim 15 further comprising circumferentially arranging said port means adjacent to said wall of said channel.

17. The method of claim 16 further comprising providing a plurality of openings for said port means.

18. The method of claim 13 further comprising controlling at least one of said volume and said velocity of pressurized air released into said channel.

19. The method of claim 18 wherein the step of controlling pressurized air includes the step of selecting said size of said port means.

20. The method of claim 13 wherein said vehicle is a helicopter and wherein said channel is defined by a short length of conduit.

* * * * *